United States Patent [19]
Negulescu

[11] Patent Number: 6,000,210
[45] Date of Patent: Dec. 14, 1999

[54] AIRCRAFT GAS TURBINE ENGINE WITH A LIQUID-AIR HEAT EXCHANGER

[75] Inventor: Dimitrie Negulescu, Berlin, Germany

[73] Assignee: BMW Rolls Royce GmbH, Oberursel, Germany

[21] Appl. No.: 08/983,033

[22] PCT Filed: Jun. 13, 1996

[86] PCT No.: PCT/EP96/02553

§ 371 Date: Apr. 27, 1998

§ 102(e) Date: Apr. 27, 1998

[87] PCT Pub. No.: WO97/02984

PCT Pub. Date: Jan. 30, 1997

[30] Foreign Application Priority Data

Jul. 7, 1995 [DE] Germany .......................... 195 24 733

[51] Int. Cl.⁶ ...................................................... F02C 7/14
[52] U.S. Cl. ........................ 60/39.02; 60/39.08; 60/39.83
[58] Field of Search ............................... 60/39.07, 39.08, 60/39.83, 226.1, 736, 39.02

[56] References Cited

U.S. PATENT DOCUMENTS 2,593,541  4/1952  Cowdrey et al. .
2,678,542  5/1954  Stanton ................................... 60/39.07
3,080,716  3/1963  Cummings et al. .................... 60/39.83
4,504,030  3/1985  Kniat et al. ............................... 244/57
5,438,823  8/1995  Loxley et al. .......................... 60/39.08

FOREIGN PATENT DOCUMENTS 0 514 119  11/1992  European Pat. Off. .
899601      6/1945   France .
942092      1/1949   France .
32 10 198  11/1982  Germany .
32 10 199  11/1982  Germany .
949585      2/1964   United Kingdom .

*Primary Examiner*—Louis A. Casaregola
*Attorney, Agent, or Firm*—Evenson, McKeown, Edwards & Lenahan, P.L.L.C.

[57] ABSTRACT

A turboprop engine having an oil cooler which is disposed in the engine pod and upon which cooling air acts. The oil cooler is disposed in a flow duct which at the rear opens into the environment and at the front can be connected alternately to an air-inlet opening or to the feed duct of the compressor of the aircraft gas turbine.

13 Claims, 1 Drawing Sheet

AIRCRAFT GAS TURBINE ENGINE WITH A LIQUID-AIR HEAT EXCHANGER

BACKGROUND AND SUMMARY OF THE INVENTION

The invention relates to an aircraft gas turbine engine, particularly a turboprop engine, having a liquid/air heat exchanger, particularly an oil cooler, which is arranged in the engine cage and which can be acted upon by a restrictedly delivered cooling air flow which is supplied by way of an opening in the engine cage. Concerning the known state of the art, reference is made in the manner of an example to European Patent Application EP 0 514 119 A1.

It may be required to arrange air-cooled liquid heat exchangers and particularly oil coolers on aircraft gas turbine engines in such a fashion that cooling air optimally flows against these heat exchangers during the flying operation as well as during the forward rolling of the aircraft as well as during the backward rolling of the aircraft on the ground. This requirement is particularly significant in the case of turboprop engines because relatively large amounts of heat must be carried away by way of the oil coolers of these engines.

A problem, particularly during the backward rolling of the aircraft is the delivery of the air current acting upon the heat exchanger. It is therefore an object of the invention to indicate a particularly advantageous solution for this problem.

For achieving this object, it is provided that the heat exchanger is arranged in a flow duct which, on the back side, leads out into the environment and which, on the front side, can optionally be connected with an air inlet opening or with an inflow duct of the compressor of the aircraft gas turbine.

Other objects, advantages and novel features of the present invention will become apparent from the following detailed description of the invention when considered in conjunction with the accompanying drawings.

BRIEF DESCRIPTION OF THE DRAWING

The drawing FIGURE is a schematic longitudinal partially sectional view of an aircraft gas turbine engine with a liquid-air heat exchanger according to a preferred embodiment of the present invention.

DETAILED DESCRIPTION OF THE DRAWING

Figure 1:
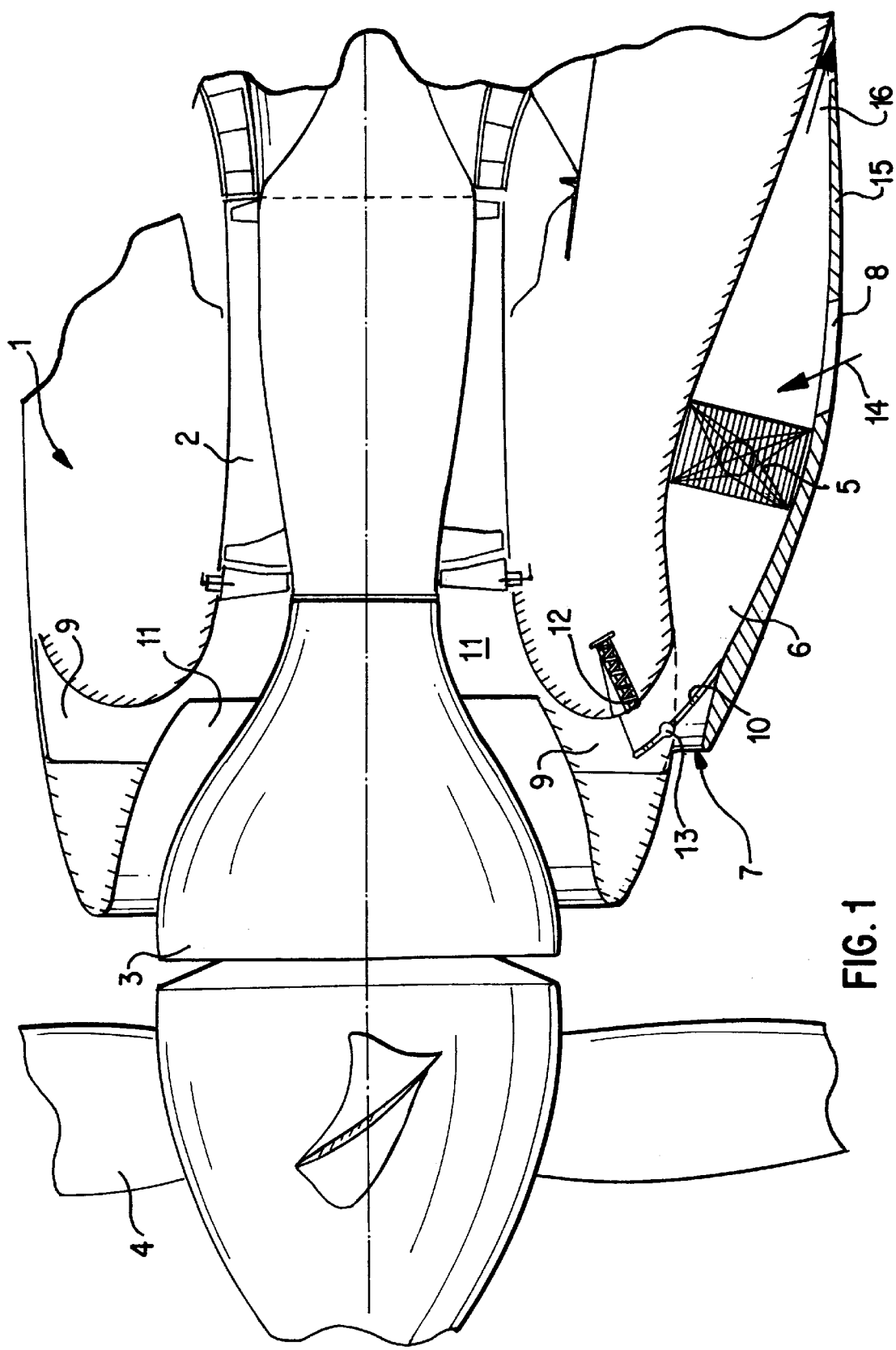

Referring to the drawing, reference number 1 indicates the engine cage or engine casing of an only partially shown turboprop engine. In this engine cage which is illustrated in a partially sectional view, an aircraft gas turbine is arranged of which essentially only the compressor 2 is shown. By means of a transmission 3, the aircraft gas turbine drives a propeller 4. Because of the high power to be transmitted, the lubricating oil of the transmission 3 is heated to such an extent that an effective oil cooling must always take place. For this purpose, a liquid/air heat exchanger 5, which in the following will also be called an oil cooler 5, is arranged essentially within the engine cage 1.

This oil cooler 5 must always be acted upon by a cooling air flow. For this purpose, the oil cooler/heat exchanger 5 is arranged in a flow duct 6 which is machined into the engine cage 1. On the front side of the engine cage 1, an air inlet opening 7 is provided which can be connected with the flow duct 6. In this case, a flow guiding flap, which has the reference number 10, is in the position illustrated by a broken line. On the other side of the oil cooler 5, the flow duct 6 leads either by way of a conventional nozzle according to the arrow 16 into the environment; or by the displacement of a movable flap 15, the flow duct 6 can also be connected with the environment by way of a transfer opening 8 in the engine cage 1.

Close to the air inlet opening 7, a so-called connecting duct 9 branches off the flow duct 6, an adjustable flow guiding flap 10 being provided in the area of the branch-off. By means of an adjusting lever 12, the flow guiding flap 10 can be swivelled about a pivot 13. This flow guiding flap 10 is illustrated in its two different end positions. When the flow guiding flap 10 is in the position illustrated by a broken line, a possible connection from the flow duct 6 to the connecting duct 9 is interrupted; that is, no air transfer is possible from the flow duct 6 into the connecting duct 9. For acting upon the oil cooler 5, the cooling air flow can then enter by way of the air inlet opening 7 directly into the flow duct 6 and can emerge again downstream of the oil cooler 5 as a cooler exhaust air flow according to arrow 16 by way of the nozzle into the environment. In this case the indicated direction of the arrow 14 has no significance.

The connecting duct 9 can establish a connection between the flow duct 6 as well as the inflow duct 11 of the compressor 2 by way of which the gas turbine operating air is supplied to the compressor 2. As illustrated, in the forward area of the engine cage 1, the flow duct 6 is situated essentially beside the inflow duct 11. When now the flow guiding flap 10 is moved from the position illustrated by a broken line into the position illustrated by a solid line, by way of the now opened connecting duct 9, the flow duct 6 is connected with the inflow duct 11, while the air inlet opening 7 is closed. Simultaneously, the flap 15 is displaced such that the nozzle is closed and the transfer opening 8 is opened. This has the result that, during the operation of the gas turbine or of the compressor 5, air is sucked off from the flow duct 6 into the inflow duct 11. As a result, an air flow arrives according to the direction of the arrow 14 by way of the transfer opening 8 in the flow duct 6, penetrates the oil cooler 5 and is finally sucked off by the compressor 2. This method of operation or this position of the flow guiding flap 10 as well as of the displaceable flap 15 will therefore be selected if, for cooling purposes, an air flow is to be sent through the oil cooler 5 but if—for example, because of a reversing of the aircraft—virtually no air flow can reach the oil cooler 5 by way of the air inlet opening 7. In the sense of an advantageous combination of functions, the compressor 2 will then simultaneously operate as a delivery device for a cooling air flow which acts upon the liquid/air exchanger 5.

Since the partially relatively hot cooler exhaust air is supplied to the compressor 2 during the delivery of the cooling air flow acting upon the oil cooler 5, this action upon the compressor 2 by hot air should take place so that it is as much as possible uniformly distributed along the circumference of the compressor 2. Since, as usual, the inflow duct 11 of the compressor 2 has a ring-shaped construction, the connecting duct 9, being adapted to the essentially ring-shaped engine cage 1, also has a ring-shaped construction. By means of the transfer of the cooler exhaust air by way of the opened flow guiding flap 10 into the connecting duct 9, this hot cooler exhaust air will be distributed at least essentially uniformly along this ring-shaped connecting duct 9 and will thus arrive in the compressor inflow duct 11 in an essentially uniformly distributed manner. If, at a later point in time, the flow again approaches the described aircraft gas turbine engine from the front, so that a sufficiently high cooling air flow is available which acts upon the air inlet opening 7, the flow guiding flap 10 is again brought into the position illustrated by a broken line so that, as usual, cooling air will again flow through the oil cooler 5 from the front toward the rear with respect to the engine. By means of the described arrangement, it is therefore possible to provide a sufficiently large cooling air flow for the admission to the liquid/air heat exchanger or oil cooler 5 in a simple manner under all operating conditions. Naturally, a large number of details, particularly of a constructive type, may be designed to deviate from the illustrated embodiment without leaving the content of the claims.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. An aircraft gas turbine engine, comprising:

an engine casing defining a flow duct, said flow duct being communicable at a rearward end with an ambient environment, and said flow duct being selectively communicable at a forward end with one of the environment and an inflow duct of a compressor of the gas turbine engine; and a transmission oil cooler arranged in said flow duct.

2. An aircraft gas turbine engine according to claim 1, wherein said flow duct is selectively communicable with said inflow duct of the compressor via a connecting duct extending therebetween.

3. An aircraft gas turbine engine according to claim 1, further comprising a flow guiding flap arranged at said forward end, said flap being adjustable to selectively communicate said flow duct with one of the environment and the inflow duct of the compressor.

4. An aircraft gas turbine engine according to claim 2, further comprising a flow guiding flap arranged at said forward end, said flap being adjustable to selectively communicate said flow duct with one of the environment and the inflow duct of the compressor.

5. An aircraft gas turbine engine according to claim 2, wherein said engine casing and said connecting duct are each annularly shaped.

6. An aircraft gas turbine engine according to claim 1, further comprising a movable flap arranged rearward of said oil cooler in said flow duct, said movable flap being displaceable to open one of a transfer opening adjacent said oil cooler and a nozzle at said rearward end of the flow duct.

7. An aircraft gas turbine engine according to claim 3, further comprising a movable flap arranged rearward of said oil cooler in said flow duct, said movable flap being displaceable to open one of a transfer opening adjacent said oil cooler and a nozzle at said rearward end of the flow duct.

8. A method of operating the aircraft gas turbine engine according to claim 7, wherein said movable flap is displaced to open said transfer opening simultaneously with adjustment of said flow guiding flap to communicate with the inflow duct of the compressor.

9. A method of operating the aircraft gas turbine engine according to claim 7, wherein said movable flap is displaced to open said nozzle simultaneously with adjustment of said flow guiding flap to communicate with the environment.

10. A method of operating the aircraft gas turbine engine according to claim 8, wherein said movable flap is displaced to open said nozzle simultaneously with adjustment of said flow guiding flap to communicate with the environment.

11. An aircraft gas turbine engine, comprising:

an engine casing defining a flow duct, said flow duct being communicable at a rearward end with an ambient environment, and said flow duct being selectively communicable at a forward end with one of the environment and an inflow duct of a compressor of the gas turbine engine, said flow duct being selectively communicable with said inflow duct of the compressor via a connecting duct extending therebetween, said engine casing and said connecting duct each being annularly shaped; and a liquid-air heat exchanger arranged in said flow duct.

12. An aircraft gas turbine engine comprising:

an engine casing defining a flow duct, said flow duct being communicable at a rearward end with an ambient environment, and said flow duct being selectively communicable at a forward end with one of the environment and an inflow duct of a compressor of the gas turbine engine;

a liquid-air heat exchanger arranged in said flow duct; and a movable flap arranged rearward of said heat exchanger in said flow duct, said movable flap being displaceable to open one of a transfer opening adjacent said heat exchanger and a nozzle at said rearward end of the flow duct.

13. An aircraft gas turbine engine according to claim 12, further comprising a flow guiding flap arranged at said forward end, said flap being adjustable to selectively communicate said flow duct with one of the environment and the inflow duct of the compressor.

* * * * *